Figure 1:
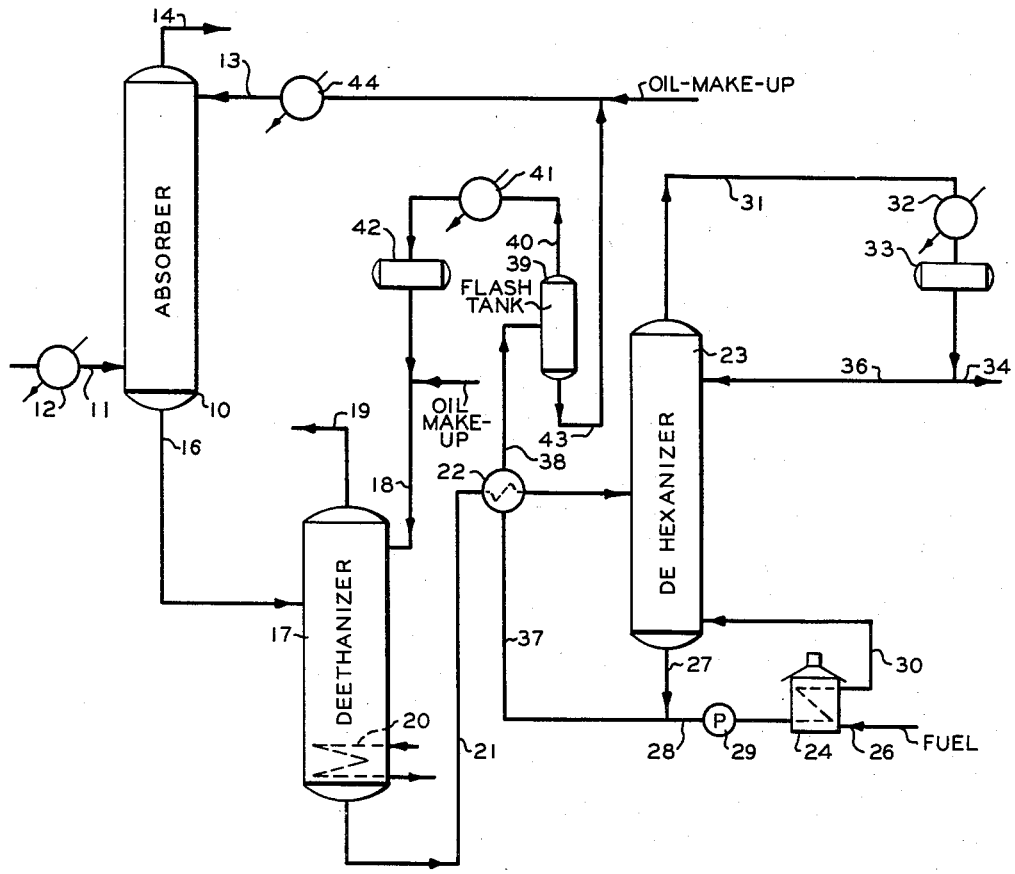

Oct. 4, 1960  J. R. COBB, JR  2,955,081
DUAL ABSORPTION PROCESS WITH A REBOILED ABSORPTION ZONE
Filed Dec. 15, 1958  2 Sheets-Sheet 2

INVENTOR.
J.R. COBB, JR.
BY Hudson & Young
ATTORNEYS

United States Patent Office 2,955,081
Patented Oct. 4, 1960

2,955,081
DUAL ABSORPTION PROCESS WITH A REBOILED ABSORPTION ZONE

Joseph R. Cobb, Jr., Bartlesville, Okla., assignor to Phillips Petroleum Company, a corporation of Delaware Filed Dec. 15, 1958, Ser. No. 780,407

8 Claims. (Cl. 208—344)

This invention relates to a novel absorption process. In one of its more specific aspects it relates to a method of reducing the loss of light components from an absorption oil used to absorb low boiling liquids from a gas stream.

The natural gasoline industry is showing increasing interest in the recovery of natural gasoline from lean natural gases that have heretofore been considered as containing marginal amounts of natural gasoline hydrocarbons, for example, containing less than one gallon of natural gasoline per 1,000 cubic feet. It has been discovered that natural gasoline can profitably be recovered from such natural gases using a refrigerated absorption oil. These low temperature absorption operations generally include an absorber, a stabilization step in which light hydrocarbons such as ethane are removed from the rich oil from the absorber and a distillation step in which the recovered gasoline hydrocarbons are separated from the rich oil. Steam stripping of the rich oil is undesirable in these low temperature processes because of the possibility of hydrate formation. Therefore, a reboiled stripper is used. In many instances a fractionating column using a reboiler is preferred to a steam stripper because of lower utility costs, even when hydrate formation is not a problem.

The use of a reboiled stripper to regenerate the absorption oil presents the additional problem of providing a proper bubble point (initial boiling point) for the absorption oil without obtaining high losses of the light components in the absorber. Considerable work has been done to establish absorption oil compositions that will provide a desired bubble point with a minimum loss of light hydrocarbons. A solution to this problem offered by the prior art involves an additional absorption step to recover these light components from the main absorber overhead stream.

My invention capitalizes upon the fact that lean absorption oil is also used in the stabilization step and therein is combined with the rich oil from the absorber before the rich oil is passed to the reboiled stripper. I have found that the above-described absorption process can be very effectively operated by using an absorption oil containing a sufficient amount of light hydrocarbons to give the desired bubble point in the kettle of the reboiled stripper, distilling the lean absorption oil coming from the reboiled stripper to form a liquid fraction and a vapor fraction, passing at least a portion of this liquid fraction to the absorber, condensing the vapor fraction, and using this condensate as lean absorption oil in the stabilization step. In another embodiment of my invention which provides similar advantages, condensate of the distilling step can be returned directly to the reboiled stripper, preferably to the kettle. The practice of my invention applies generally to any absorption operation which employs an absorber, a rich oil stabilizer and a reboiled stripper rather than a steam stripper for regeneration of the absorption oil.

Figure 2:
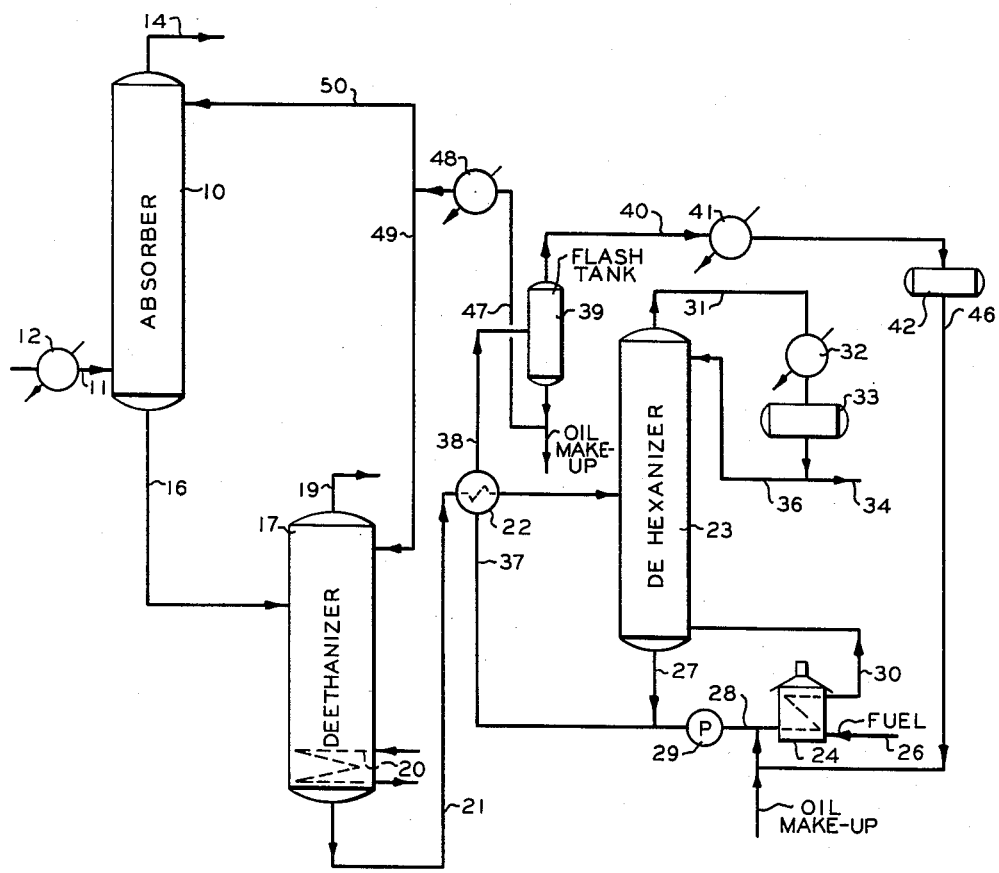

It is an object of my invention to provide an improved absorption process. Another object is to reduce the loss of light components from an absorption oil employed to absorb low boiling hydrocarbons from the gas stream at low temperature. Still another object is to reduce the cost of natural gasoline recovery from lean natural gases containing marginal amount of gasoline hydrocarbons. Another object of my invention is to permit a wider selection of absorption oil composition in such a process without the commonly attendant problem of light hydrocarbon losses. An additional object is to eliminate the necessity of extra recovery operations, such as processing the absorber overhead stream, to prevent loss of light components from the absorption oil. Other objects, advantages and features of my invention will be apparent to those skilled in the art from the following discussion and drawings in which:

Figure 1 is a schematic diagram showing one aspect of my invention in which a lean absorption oil is flashed, vapors are condensed and the condensate is used in the stabilization column; and Figure 2 is a schematic diagram of another aspect of my invention in which the condensate is returned to the kettle of reboiled stripper.

Broadly, my invention can be used in any absorption process using the basic steps of absorption, stabilization of rich oil, and stripping the rich oil of absorbed materials in a reboiled stripper. My invention is of particular advantage, however, when applied to recovery of gasoline boiling range hydrocarbons from natural gas. One of its major advantages lies in the reduction of costs in an already marginal operation of recovering natural gasoline from lean natural gas; however, the advantages of reduced absorption oil losses can also be enjoyed in a process in which the feed stream is rich in natural gasoline. In the preferred aspect of my invention which is depicted by Figure 1, I take advantage of the fact that the oil losses from the stabilizing column, or deethanizer, are normally quite low. Therefore, by flashing the lean oil to form two streams of light and heavy components, feeding the heavier stream to the absorber and using the lighter stream as lean oil in the deethanizer, I am able to reduce considerably the loss of light components over the process in which the lean absorption oil is simply divided between the absorber and stabilizer without passing through the flashing step. Normally, the absorption oil is divided with a major amount, for example, 75 percent of the oil, passing to the absorber, and the remainder is used in the deethanizer. The flashing step permits the light components of the absorption oil, which are necessary to give the required bubble point in the reboiled stripper, to bypass the main absorber where losses of these components tend to be high. As shown in the aspect of Figure 2, these light components can be routed so that they bypass both the absorber and the deethanizer, returning directly to the kettle of the reboiled stripper. Losses can be even further reduced by the scheme of Figure 2, but a larger amount of absorption oil must be used in the system in order to meet the demands of both the absorber and the deethanizer with only the heavier fraction of the lean absorption oil.

To explain more fully my invention reference is now made to Figure 1 which will be described in connection with a specific embodiment in which absortpion oil is employed to recover gasoline hydrocarbons from a natural gas stream at a low temperature, for example, about 10° F. The natural gas stream is fed to absorber 10 through line 11. If desired this stream can be precooled by passing through heat exchanger 12. In absorber column 10 the natural gas stream is contacted with the lean absorption oil entering through conduit 13. A gas stream, predominantly methane, leaves overhead from the absorber through line 14.

Rich absorption oil passes from the bottom of absorber 10 through line 16. This rich absorption oil contains most of the gasoline boiling range hydrocarbons entering the system with the natural gas stream together with considerable amounts of normally gaseous hydrocarbons such as methane and ethane. To remove most of these normally gaseous hydrocarbons the rich oil is passed to the stabilizing column, or deethanizer, 17. This column is commonly referred to as a reboiled absorber since the absorption oil is heated in the kettle of the column and additional lean absorption oil is added at the top of the column with the feed stream entering at an intermediate point. Lean absorption oil is shown entering column 17 through line 18. Leaving overhead from column 17 is gaseous stream 19 which is predominantly methane and ethane. In the bottom of column 17 is a heating means shown in this figure by the steam coils 20. An external reboiler could be used as well.

The lean oil added through line 18 passes through the column, scrubbing the heavier hydrocarbons from the rising vapors, and combines with the rich oil in the kettle of column 17. The resulting total rich oil stream passes from the bottom of column 17 through line 21 and heat exchanger 22 to dehexanizer 23. This dehexanizer is a reboiled stripper, or fractionating column, and is shown in Figure 1 using an external reboiler 24 fired by fuel entering through line 26. Lean oil bottoms from the dehexanizer are circulated through this reboiler by passing through line 27, line 28, pump 29 and returning to the kettle of the dehexanizer through line 30. The overhead vapors from the dehexanizer which are predominantly gasoline boiling range hydrocarbons with a few lighter components, such as propane and butane, pass through line 31 and are condensed in condenser 32. The condensate is accumulated in tank 33 and this condensate is divided into a production stream 34 and a reflux stream 36 which returns to column 23.

The absorption oil having had the gasoline hydrocarbons and lighter components, which were picked up in absorber 10 and stabilizer 17, removed therefrom passes through line 37 and heat exchanger 22 where it is partially cooled by the rich oil passing from the deethanizer to the dehexanizer through line 21. This lean oil continues through line 38 to flash tank 39 wherein the pressure is reduced and the lean oil is permitted to flash into light and heavy fractions. A substantial amount of the lighter components are in the vapor phase which leave overhead through line 40 and are condensed in condenser 41. This condensate is accumulated in tank 42 and then passes through line 18 to the deethanizer as previously described.

It should be understood that this condensate is not exclusively the lighter component of the total lean absorption oil since a single flashing step will not accomplish such a sharp separation. Even if a multi-stage distillation is used, a cut should be made so that some of the heavier components are present in the lean absorption oil which is used in reboiled absorber 17. A single flash step is an especially convenient method of accomplishing the lean oil separation for this particular process. The heavier fraction of the lean absorption oil is in the liquid phase and passes from flash tank 39 through line 43. This liquid is cooled in refrigerated heat exchanger 44 and then passes through line 13 into the top of absorption column 10. Since this lean absorption oil entering absorption column 10 has been reduced in concentration of lighter components, for example, $C_5$–$C_7$, the loss of these components from the absorber overhead is correspondingly reduced.

Referring to Figure 2, another aspect of the invention is shown in which the flash tank overhead from accumulator 42 is passed through line 46 to conduit 28. In this manner the lighter fraction of the lean absorption oil is recycled to the kettle of the dehexanizer so that it can be employed to provide the desired bubble point in this column. In this aspect the heavier fraction in flash tank 39 passes through line 47 and is cooled in refrigerated heat exchanger 48. This fraction of the main absorption oil is then divided into two streams, 49 and 50, stream 49 passing to the deethanizer and stream 50 to the absorber. Since only the heavier fraction of the lean absorber oil is used for absorption purposes the loss of light components from this oil is thereby reduced. However, it can be seen that an additional volume of absorption oil is required for the process of Figure 2 since only a portion of the total oil is used for absorption purposes.

The absorption oil which is used for my invention can vary considerably in composition since components thereof are selectively used in the process for their best advantage. Broadly, the composition of the absorption oil will vary between $C_4$ and $C_{16}$ hydrocarbons with at least a portion of the oil being greater than $C_{10}$ and a portion being below $C_{10}$. The relative amounts of each hydrocarbon constituent will depend on the total composition of the lean oil. For example, the oil can suitably be a blend of 200 molecular weight absorption oil and sufficient light component to provide a bubble point in the kettle of the reboiled stripper of about 450–500° F. at 125 pounds per square inch absolute. For example, if normal butane is used to make a bubble point in the stripper only about 16 percent of the oil could be butane and 84 percent of the oil can be made up of a 200 molecular weight oil, whereas a $C_9+$ absorption oil mixture would have to be almost entirely $C_9$ with only about 6 percent heavier oil. An oil which is presently recommended for use in low temperature absorption of gasoline from natural gases is an absorption oil containing about 72.5 percent of a $C_{11}$ fraction, about 20 percent of $C_8$, 5.3 percent $C_7$ and 2.2 percent lighter components, percentages being given on a molar basis. $C_{12}$ or $C_{13}$ up to $C_{16}$ fractions can be used instead of or in addition to the $C_{11}$ fraction which is the basic oil.

Generally, the composition of the oil will tend to build up in the gasoline boiling range hydrocarbons so that losses of these components represent a loss in the recovered gasoline rather than a loss of the basic absorption oil. As used in this discussion of my invention, however, the term "lean absorption oil" refers to the total composition which is recycled from the reboiled stripper to the absorber and reboiled absorber.

My invention works very well with an absorption oil having a wide range of components. An example of such a wide range oil is as follows:

| | |
|---|---|
| 5% $C_{16}$ | 20% $C_{12}$ |
| 10% $C_{15}$ | 15% $C_{11}$ |
| 15% $C_{14}$ | 10% $C_{10}$ |
| 20% $C_{13}$ | 5% $C_9$ |

While my invention is of especial advantage in refrigerated processes, for example, those processes using a refrigerant between −10 and −40° F. in the absorption oil heat exchanger and an absorption temperature below 30° F., it is not limited to such a process and the temperature in the absorber can broadly vary from −100 to +100° F. The entering gas stream does not have to be refrigerated but this is preferred in the low temperature process. The overhead vapors from the stabilizer are of much lower volume than the overhead from the absorber and even though the lighter components are more concentrated in the lean oil to the stabilizer, the loss of these components is considerably less than when the absorption oil is used in the absorber without flashing. The temperature of the lean oil fed to the stabilizer should not exceed 70° F. in order to keep the stripping action in the stabilizer low. Preferably the lean oil fed to the stabilizer is about the same temperature as the lean oil fed to the absorber. To further describe my invention the following example is presented in which specific process conditions and stream compositions are given. These are presented as being typical and should not be interpreted to limit my invention unduly.

EXAMPLE I

As shown in Figure 1, natural gas containing gasoline hydrocarbons is passed to a 30 tray absorption column at 0° F. and 800 pounds per square inch. The temperature in top and bottom of the column is maintained at 10° F. A lean absorption oil at 0° F. is passed to the top of this column. The rich absorption oil is stabilized in a reboiled deethanizer containing 40 trays at a pressure of 250 p.s.i.a. Refrigerated absorption oil at 0° F. is added at the top of the deethanizer column which is maintained at 10° F. The deethanizer kettle temperature is 400° F. Rich absorption oil leaving the deethanizer passes to the dehexanizer which is a fractionating column having an external reboiler and 40 trays. The dehexanizer is operated at 125 p.s.i.a. and the kettle temperature at 500° F. This temperature is maintained by circulating lean oil through an external reboiler. This oil is heated to 550° F. and returned to the column. The top of the dehexanizer is maintained at 0° F. by reflux of condensed overhead gasoline liquids.

A lean oil from the kettle of the dehexanizer is withdrawn and flashed at 20 p.s.i.a. to form two streams of liquid and vapor. A liquid fraction is refrigerated and passed to the top of the absorption column. The vapor fraction is condensed and the condensate is passed to the top of the reboiled deethanizer as shown in Figure 1. The composition of the various streams is presented in Table I in pound-mols per day. The total oil loss as shown in Table I is 13.46 pound-mols per day.

EXAMPLE II

A process identical to that of Example I is carried out except that the lean absorption oil from the bottom of the dehexanizer is not flashed but is refrigerated and divided into two streams of identical composition, one stream passing to the absorption column and the other to the deethanizer. Stream compositions are shown in Table II and the total oil loss is 18.25 pound mols per day.

As will be evident to those skilled in the art, various modifications of this invention can be made, or followed, in the light of the foregoing disclosure and discussion, without departing from the spirit or scope thereof.

Table I

| Stream | Line No. Fig. 1 | $CO_2$ | $N_2$ | $C_1$ | $C_2$ | $C_3$ | $iC_4$ | $nC_4$ | $iC_5$ | $nC_5$ | $C_6$ | $C_7$ | $C_8$ | $C_{11}$ | Total |
|---|---|---|---|---|---|---|---|---|---|---|---|---|---|---|---|
| Absorber Feed | 11 | 100 | 100 | 73,963 | 5,048 | 2,565 | 955 | 1,176 | 213 | 236 | 213 | 130 | 130 | | 84,829 |
| Absorber Lean Oil | 13 | | | | | | | | | 12 | 143 | 475 | 2,104 | 9,923 | 12,657 |
| Absorber Overhead | 14 | 92 | 91 | 70,350 | 3,786 | 641 | 86 | 90 | | 1.4 | 2.4 | 2.50 | 4.30 | 1.57 | 75,148 |
| Deethanizer Feed | 16 | 8 | 9 | 3,613 | 1,262 | 1,924 | 869 | 1,086 | 213 | 247 | 354 | 602 | 2,230 | 9,921 | 22,338 |
| Deethanizer Overhead | 19 | 8 | 9 | 3,613 | 1,222 | 133 | | | | 0.20 | 0.54 | 0.26 | 0.24 | 0.05 | 4,986 |
| Deethanizer Lean Oil | 18 | | | | | | | | | 19 | 160 | 328 | 900 | 949 | 2,356 |
| Dehexanizer Feed | 21 | | | | 40 | 1,791 | 869 | 1,086 | 213 | 266 | 513 | 930 | 3,130 | 10,870 | 19,708 |
| Dehexanizer Overhead Product | 34 | | | | 40 | 1,791 | 869 | 1,086 | 213 | 236 | 213 | 130 | 130 | | 4,708 |
| Dehexanizer Bottoms Product | 37 | | | | | | | | | 30 | 300 | 800 | 3,000 | 10,870 | 15,000 |
| Flash Tank Bottoms | 43 | | | | | | | | | 11 | 141 | 472 | 2,100 | 9,921 | 12,645 |
| Flash Tank Overhead | 40 | | | | | | | | | 19 | 159 | 328 | 900 | 949 | 2,355 |
| Loss | | | | | | | | | | 1.60 | 2.94 | 2.76 | 4.54 | 1.62 | 13.46 |

Table II

| Stream | Line No. Fig. 1 | $CO_2$ | $N_2$ | $C_1$ | $C_2$ | $C_3$ | $iC_4$ | $nC_4$ | $iC_5$ | $nC_5$ | $C_6$ | $C_7$ | $C_8$ | $C_{11}$ | Total |
|---|---|---|---|---|---|---|---|---|---|---|---|---|---|---|---|
| Absorber Feed | 11 | 100 | 100 | 73,963 | 5,048 | 2,565 | 955 | 1,176 | 213 | 236 | 213 | 130 | 130 | | 84,829 |
| Absorber Lean Oil | 13 | | | | | | | | | 28 | 257 | 680 | 2,540 | 9,158 | 12,663 |
| Absorber Overhead | 14 | 92 | 91 | 70,350 | 3,786 | 641 | 86 | 90 | | 3.11 | 4.44 | 3.60 | 5.23 | 1.52 | 75,154 |
| Deethanizer Feed | 16 | 8 | 9 | 3,613 | 1,262 | 1,924 | 869 | 1,086 | 213 | 261 | 466 | 806 | 2,665 | 9,156 | 22,338 |
| Deethanizer Overhead | 19 | 8 | 9 | 3,613 | 1,222 | 133 | | | | 0.05 | 0.15 | 0.10 | 0.12 | 0.07 | 4,985 |
| Deethanizer Lean Oil | 18 | | | | | | | | | 5 | 47 | 124 | 465 | 1,714 | 2,355 |
| Dehexanizer Feed | 21 | | | | 40 | 1,791 | 869 | 1,086 | 213 | 266 | 513 | 930 | 3,130 | 10,870 | 19,708 |
| Dehexanizer Overhead Product | 34 | | | | 40 | 1,791 | 869 | 1,086 | 213 | 236 | 213 | 130 | 130 | | 4,708 |
| Dehexanizer Bottoms Product | 37 | | | | | | | | | 30 | 300 | 800 | 3,000 | 10,870 | 15,000 |
| Loss | | | | | | | | | | 3.16 | 4.59 | 3.70 | 5.35 | 1.45 | 18.25 |

I claim:

1. An absorption process utilizing an absorption zone, a reboiled absorption zone, and a reboiling fractionation zone, comprising contacting a feed stream with absorption oil in said absorption zone to separate normally liquid components from normally gaseous components of said feed stream, passing the resulting rich absorption oil to said reboiled absorption zone, removing normally gaseous components from said rich absorption oil, contacting said gaseous components with lean absorption oil in the upper region of said reboiled absorption zone, combining the two fractions of absorption oil, fractionating the combined rich absorption oil in said fractionation zone to separate said normally liquid components from said absorption oil thus forming a lean absorption oil recycle stream, said lean absorption oil having light and heavy components, distilling said lean absorption oil recycle stream to form a liquid fraction and a vapor fraction, passing a portion of said liquid fraction to said absorption zone, and returning said vapor fraction to said fractionating zone by-passing said absorption zone.

2. The process of claim 1 wherein said vapor fraction is condensed and fed to said reboiled absorption zone as lean absorption oil.

3. The process of claim 1 wherein said vapor fraction is condensed and fed directly to the reboiler of said fractionating zone.

4. An improved process for recovering natural gasoline from natural gases which comprises, flashing lean mineral seal oil subsequently described to form a liquid fraction and a vapor fraction, contacting said natural gases with said liquid fraction thereby absorbing gasoline boiling range hydrocarbon plus some normally gaseous hydrocarbon from said natural gases and forming a rich oil stream, heating said rich oil stream to form vapors and remove normally gaseous hydrocarbon therefrom, condensing said seal oil vapor fraction to a condensate, contacting said vapors with said condensate, combining said condensate with said rich oil in said heating step, passing the combined oil from said heating step to a rectification step in which said oil is reboiled to provide the stripping vapors for said rectification, recovering gasoline boiling range hydrocarbon overhead from said rectification, and recovering from the bottoms of said rectification said lean mineral seal oil first mentioned.

5. An improved process for recovering natural gasoline from natural gases which comprises, flashing lean mineral seal oil subsequently described to form a liquid fraction and a vapor fraction, contacting said natural gases with a portion of said liquid fraction thereby absorbing gasoline boiling range hydrocarbon plus some normally gaseous hydrocarbon from said natural gases and forming a rich oil stream, heating said rich oil stream to form vapors and remove normally gaseous hydrocarbon therefrom, contacting said vapors with the remainder of said liquid fraction and combining the resultant liquid with said rich oil in said heating step, passing the combined oil from said heating step to a rectification step in which said oil is reboiled to provide the stripping vapors for said rectification, condensing said seal oil vapor fraction to a condensate, adding said condensate to the oil being reboiled in said rectification step, recovering gasoline boiling range hydrocarbons overhead from said rectification, and recovering from the bottoms of said rectification said lean mineral seal oil first mentioned.

6. An improved process for recovering hexane from natural gases containing methane, ethane and hexane which comprises flashing lean mineral seal oil subsequently described to form a liquid fraction and a vapor fraction, condensing said vapor fraction to form a condensate, contacting said natural gases with said liquid fraction at a temperature in the range of −100 to +100° F. thereby absorbing hexane and ethane from said natural gases and forming a rich oil stream, heating said rich oil stream to form vapors of hexane and ethane, contacting said vapors with said condensate at a temperature below 70° F. to absorb hexane therefrom, said heating and condensate contacting steps serving to deethanize said rich oil stream, combining said condensate from said contacting step with said rich oil in said heating step, passing the combined oil from said heating step to a rectification step in which said oil is reboiled to provide the stripping vapors for said rectification, recovering hexane overhead from said rectification, and recovering from the bottoms of said rectification said lean mineral seal oil containing hydrocarbons having in the range of 4 to 16 carbon atoms per molecule with at least a portion of the hydrocarbons having more than 10 carbon atoms per molecule and at least a portion having less than 10 carbon atoms.

7. The process of claim 6 wherein said seal oil is refrigerated before said contacting steps and the absorption temperature is below 30° F.

8. The process of claim 6 wherein said seal oil has a bubble point of about 450 to 500° F. at 125 p.s.i.a. and contains at least about 70 mol percent hydrocarbon having more than 10 carbon atoms per molecule.

References Cited in the file of this patent

UNITED STATES PATENTS

| | | |
|---|---|---|
| 2,290,957 | Hachmuth | July 28, 1942 |
| 2,355,588 | Brandt | Aug. 8, 1944 |
| 2,745,889 | Johnston et al. | May 15, 1956 |